Figure 3:
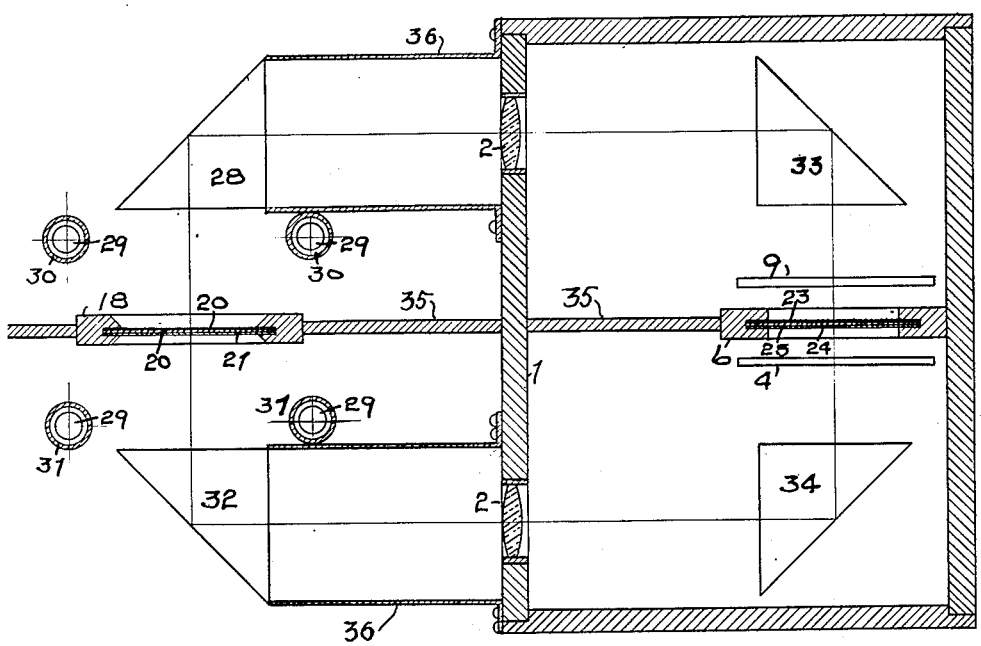

P. D. BREWSTER.
COLOR CINEMATOGRAPHY.
APPLICATION FILED NOV. 7, 1914.
1,253,137.
Patented Jan. 8, 1918.
2 SHEETS—SHEET 1.
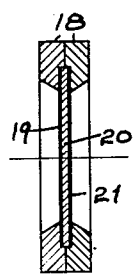
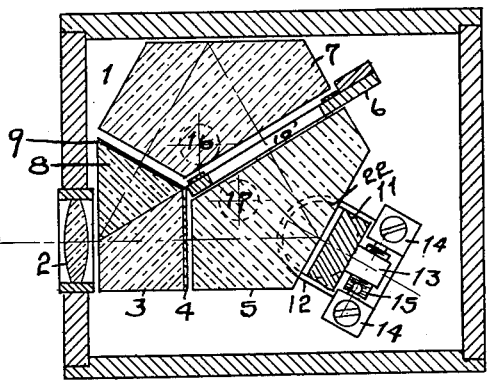
FIG-1-
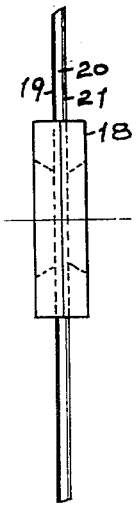
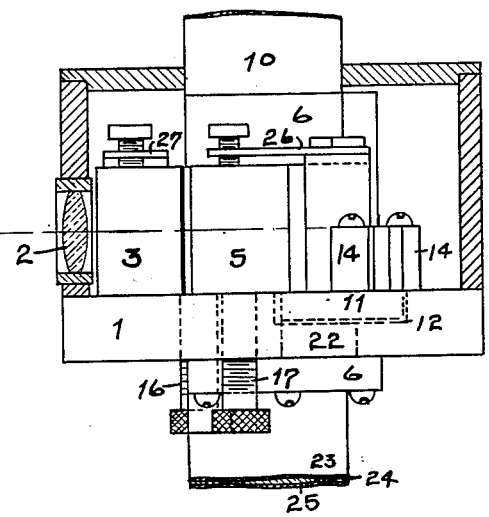
FIG-2-

UNITED STATES PATENT OFFICE.

PERCY D. BREWSTER, OF EAST ORANGE, NEW JERSEY.

COLOR CINEMATOGRAPHY.

1,253,137.     Specification of Letters Patent.     Patented Jan. 8, 1918.

Application filed November 7, 1914. Serial No. 870,754.

*To all whom it may concern:*

Be it known that I, PERCY D. BREWSTER, a citizen of the United States, residing at East Orange, in the county of Essex and State of New Jersey, have invented certain new and useful Improvements in Color Cinematography, of which the following is a full, clear, and exact description.

This invention (in part disclosed originally in my prior application Ser. No. 815,153, filed January 29th, 1914), relates to color-cinematography, particularly the printing of positive images on the two sensitive surfaces of a film coated on both sides. Such a positive is described in detail in my copending application Ser. No. 843,341, filed June 6, 1914.

More particularly the invention relates to the printing of positives by the projection of negative images upon the sensitive surfaces or coatings of the positive from opposite sides thereof, so that neither coating of the positive film need be transparent. To this and other ends the invention consist in the novel method, and the novel steps thereof, hereinafter described.

Convenient and effective apparatus for use in practising the invention is illustrated in the accompanying drawings in which Figure 1 is a horizontal section through the camera and film gate; Fig. 2 a side elevation, partly in section of the same camera, and Fig. 3 is a sectional plan view of a modified camera.

The camera is similar to that described in my copending patent application Ser. No. 815,153, above mentioned, in which the camera is primarily intended for making negatives and is adapted to use film described in my copending application Ser. No. 855,943, filed Aug. 10, 1914.

The camera consists of a base 1 upon which are mounted the prisms 3, 5, 7 and 8 and the film gate 6 through which the double-coated film 10 passes, all suitably housed to protect the film from light. The double-coated negative film, consisting of the transparent support 20 with the images on the two sides 19 and 21 in different colors, is mounted in the film gate 18 at a proper distance from the lens 2 of the camera. The prism 8 (which may be an equilateral triangular prism with its reflecting angle at 30 degrees to the axis of the lens) is mounted to receive a portion of the light (for example half the light as in Fig. 1) projected by the lens and to reflect such portion to prism 7, from the surface 7ª of which the light is reflected onto one side 25 of the film 10, the reflecting surface of prism 7 being silvered; while the other portion of the light from the lens passes through block 3 and prism 5 and is reflected against the other side 23 of the same film.

As explained in my copending applications Ser. Nos. 815,153 and 835,943 above referred to, the images on the two sides of the negative 20 are taken by light of different colors or groups of colors; as for example, on one side by red, orange and yellow, and on the other side by yellow-green, green, blue and violet. Hence neither series of images renders the object correctly; but when the two are viewed together, each completes the other and a correct (negative) representation of the object is produced. Accordingly the two images or series of images can be conveniently described as being "complementary" to each other, and it is with this meaning that I use the term hereinafter.

The positive film stock 10 consists of the transparent support 24, preferably celluloid, coated on one side with an emulsion 23 sensitive chiefly to one color or color-group, for example green, and on the other side with an emulsion sensitized chiefly for another color or color group of the spectrum, for example red. One side of the film may be protected in the camera by the light filter 9 adapted to pass light of only one color or group of colors, as red, and the other side of the film protected by filter 4 adapted to pass light of another color or group of colors, for instance green.

Provision is made for horizontal registration of the images on the two sides of the film by rotating the prism 5 on a center coinciding with the point of reflection of the axial ray, by mounting the prism in a holder 11, which is adapted to turn on pin 22 in the base 1, and which grips the prism by means of the spring clip 26 (Fig. 2), the rotation of the holder being controlled by the capstan screw 15 tapped into the ear 13, attached to the holder, and mounted snugly between the stops 14, 14 mounted on the base 1, so that any movement of the screws results in a corresponding shift of one image in relation to the other. Adjustment in altitude may be secured by canting one edge of either of the prisms 5 or 7 by means of paper or gold leaf, or if the base is flat and the base of the prisms square with their reflecting surfaces no adjustment is needed. The base 1 may be tapped out to receive the adjusting screws 16 and 17 adapted to bear against one edge of the prisms 5 and 7 respectively and to cant them to secure registration in altitude, the prisms being held in place by spring clips 26 and 27.

For the sake of simplicity the shutter and diaphragm on the camera and intermittent feeding mechanism on both the camera and the negative film gate are omitted, such mechanism being well known in the art. It is to be understood that the sequence of operations are first, the shutter opens and exposes a section on the positive film; then the shutter closes, and both the negative film in its film gate and the positive film in the film gate of the camera are moved forward the space of one picture (three-quarters of an inch in standard cinematographic film), after the shutter opens, exposing the second section on the positive film, and so on.

Two lenses, each designated by 2, are used in the modification illustrated in Fig. 3, and both film gates 6, 18, are located at right angles to the axes of the lenses. The negative film is adapted to pass through the film gate 18, being illuminated on one side by lights 29, 29 through the light filters 31, 31 adapted to permit the passage of light of a single color, say green, and on the other side by lights 29, 29 through light filters 30, 30 adapted to permit the passage of light of another color, say red. The green light passes through the negative film, is reflected by prism 28, and is projected by lens 2 against the green sensitized surface 23 of the positive film through prism 33 and green filter 9; while the red light passes through the film, is reflected by prism 32 and is projected by the lens through prism 34 and red filter 4 against the red sensitized side 25 of the film. (The filters 4 and 9 are used, when the film is panchromcatically sensitized on both sides, to prevent the action of other colored light on the side of the film for which it was not intended.) Divisional walls 35 and lens-hoods 36 are provided to prevent the film being acted on by stray light of either color.

Any or all of the prisms may be provided with horizontal and vertical adjustments, for example as illustrated in Figs. 1 and 2, to secure proper registration of the image on the two sides of the film, and these adjustments may be used to produce, in proper registry on the positive film, images from negatives that are out of registry. If for any reason the optical parts of the camera used for making the cinematographic negatives shifted the pictures or images on the two sides of the negative film out of registry the error would be in the same direction in each succeeding picture so that the prisms in the printing camera, of either type, can be thrown out of true adjustment to compensate for the error in the negative film and print properly registering positives from the defective negative film.

It is apparent that autochromes, and any type of color negative, may be used in the present invention, and that the printing lights may be of any colors. and that even white light may be used. If the specially sensitized double coated film described in my patent application above mentioned, Ser. No. 843,351, filed June 6, 1914, be used, the light filters may be dispensed with. Mirrors may be substituted for prisms in the camera if desired.

The double coated positive film stock described in my copending patent application Ser. No. 843,351, filed June 6, 1914, in which the emulsion on one side is sensitized chiefly for light of one color; say green, while the emulsion on the other side is sensitized chiefly for another color, say red, may be used in either type of camera described and the light filters dispensed with, or if white light is used for printing, filters may be used to reduce or eliminate all the blue and violet light.

After exposure as described, the film is developed and fixed, thereby producing the positive images, one on each side of the film. Neither of these images would, if viewed separately, be a correct rendering of the colored object photographed, but when viewed simultaneously, as by transmitted light or by projection on a screen, the two images complete each other and give a single correct image. In short, the images are complementary in density and gradation. The two images are now colored in different colors, preferably in conformity with the colors of the rays by which the negatives from which they were printed were produced, as for example green and red. This coloring can be effected in any convenient way, as by the method described in my copending application Serial No. 747,712, filed Feb. 11, 1913. Then when the images are viewed simultaneously the unitary image produced will be seen in substantially the natural colors of the object photographed.

In the appended claims the expression "suitable registry" is used to mean such exactness of registration as may be necessary to produce the desired congruence of the two images when viewed by transmitted light or when projected on a screen, as the case may be.

Instead of negative images, positive images may be projected on to the positive film. Development then gives negative images, which can be converted into positives by reversal in any convenient way. In this case reversal corresponds, in a sense, to fixation in the other case.

It is to be understood that the invention is not limited to the specific procedure herein described, but can be practised in other ways without departure from its spirit.

I claim:

1. In the art of color photography, the improvement in the production of color-positives, which consists in projecting upon one side of a positive film sensitized on both sides an image from a negative film having complementary images of an object, and on the other side of the positive film and in suitable registry with the first a complementary image from the same negative film; developing and fixing both sides of the positive film; and coloring the resulting images in different colors.

2. In the art of color photography, the improvement in the production of color-positives, which consists in projecting upon one side of a positive film sensitized on both sides an image from one side of a negative film having suitably registered and complementary images on its two sides, and upon the other side of the positive and in suitable registry with the first named image an image complementary thereto from the other side of the same negative film; developing and fixing both sides of the positive film; and coloring in different colors the images thus produced.

3. In the art of color photography, the improvement in the production of positives, which consists in projecting upon one side of a positive film sensitized on both sides an image from a color-negative film having complementary images in fixed position relative to each other, and upon the other side of the positive film and in suitable registry with the first named image a complementary image from the same negative film; developing and fixing both sides of the positive film; and coloring the images thus produced, in one color on one side of the positive film and in a different color on the other side.

4. In the art of color photography, the improvement in the production of positives, which consists in projecting upon opposite sides of a positive film complementary and suitably registered images from a single negative film having complementary images; developing and fixing both sides of the positive film; and coloring in one color the images thus produced on one side of the positive film and in a different color the images on the other side.

5. In the art of color photography, the method of producing positives from a color-negative, which consists in projecting negative images upon the opposite sides of a positive film color-sensitized on both sides and in light of two different colors or color-groups, developing and fixing the said sensitized surfaces thereby producing complementary positive images, and coloring the positive images in different colors, as set forth.

6. In the art of color photography, the method of producing positives, comprising arranging in front of the optical system of a suitable camera a color-negative having suitably registered images of the same object on its opposite sides, and in rear of the lens a film sensitized on both sides; projecting one of said images upon one side of the film in light of one color or group of colors and the other image upon the other side of the film in suitable registry with the first and in light of a different color or group of colors, developing and fixing both sides of the film to produce two substantially complementary positive images, and then coloring the positive images in different colors, as set forth.

7. In the art of color photography, the method of producing positives from a negative film having on one side and in one color a negative image of an object and on the other side a negative image of the same object in suitable registry with the first and in another color, comprising projecting the first image in light of its own color upon one side of a positive film sensitized on both sides and upon the other side projecting the second image in light of its own color and in suitable registry with the first projected image; developing and fixing both sides of the positive film; and coloring the resulting positive images in two different colors; as set forth.

8. In the art of color photography, the improvement in the production of color-positives, which consists in arranging in front of a suitable camera having optical projecting means a negative film having complementary images in fixed relation to each other, and in rear of the lens a positive film sensitized on both sides; projecting one of the negative images upon one side of the positive film and the complementary negative image upon the other side of the positive film and in suitable registry with the first projected image; developing and fixing both sides of the positive film; and coloring the resulting images in two different colors.

9. In the art of color photography, the method which consists in projecting upon one side of a positive film sensitized on both sides an optical image from a photographic image carried by a negative film and produced by light of one color or group of colors, and upon the other side of the positive film and in suitable registry with the first-mentioned image an optical image from a photographic image carried by the same negative film and produced by light of a different color or group of colors; developing and fixing both sides of the positive film; and coloring in different colors the photographic images thus produced.

In testimony whereof I affix my signature in the presence of two subscribing witnesses.

PERCY D. BREWSTER.

Witnesses:
M. LAWSON DYER,
S. S. DUNHAM.